United States Patent [19]
Falater

[11] Patent Number: 5,389,870
[45] Date of Patent: Feb. 14, 1995

[54] METHOD AND APPARATUS FOR FILTERING ALTERNATOR RIPPLE USING SYNCHRONOUS SAMPLING

[75] Inventor: Scott L. Falater, Phoenix, Ariz.

[73] Assignee: SGS-Thomson Microelectronics, Inc., Carrollton, Tex.

[21] Appl. No.: 59,008

[22] Filed: May 6, 1993

Related U.S. Application Data

[63] Continuation of Ser. No. 801,765, Nov. 29, 1991, abandoned.

[51] Int. Cl.⁶ .............................................. H02J 7/14
[52] U.S. Cl. ......................................... 322/28; 322/58
[58] Field of Search ..................... 322/28, 58, 59, 73, 322/99

[56] References Cited

U.S. PATENT DOCUMENTS

| 4,128,799 | 12/1978 | Morishima | 322/28 |
| 4,223,363 | 9/1980 | Santis et al. | 322/28 |
| 4,315,204 | 2/1982 | Sievers et al. | 322/28 |
| 4,340,849 | 7/1982 | Kunn | 322/28 |
| 4,872,127 | 10/1989 | Nolan | 364/602 |
| 4,920,308 | 4/1990 | Edwards et al. | 322/58 |
| 4,962,348 | 10/1990 | Edwards | 322/58 |
| 5,599,552 | 7/1986 | Phillips et al. | 322/28 |

FOREIGN PATENT DOCUMENTS

| 0022500 | 2/1985 | Japan | 322/58 |
| 3086100 | 5/1991 | Japan | |

Primary Examiner—Kristine L. Peckman
Attorney, Agent, or Firm—Richard A. Bachand; Lisa K. Jorgenson; Richard K. Robinson

[57] ABSTRACT

A circuit and a method for filtering the ripple in an output of a multi-phase alternator in a vehicle system having a regulating circuit that regulates the output of the alternator includes a switch connected in series between a system voltage and the input of the regulating circuit, and circuitry for closing the switch at a predetermined phase of the voltage of at least one of the stator windings of the alternator. The circuitry for closing the switch operates to close the switch at a conduction switchover point among the stator windings in synchronism with a voltage waveform of the at least one of the stator windings, and is timed to produce an aliased waveform for application to the regulator. The output of the switch is applied to an integrator for integrating the output voltage from the alternator during an entire time cycle period of one of the windings of the stator coils for application to the regulator.

9 Claims, 1 Drawing Sheet

METHOD AND APPARATUS FOR FILTERING ALTERNATOR RIPPLE USING SYNCHRONOUS SAMPLING

This is a continuation of copending application Ser. No. 07/801,765 filed on Nov. 29, 1991, now abandoned.

BACKGROUND OF THE INVENTION

1. Field of the Invention

This invention relates to improvements in filter circuitry for use in conjunction with alternators of the type used in automotive or vehicular applications, and, more particularly, to improvements in methods and apparatuses for filtering the ripple in a multi-phase alternator in a vehicle system employing synchronous sampling techniques.

2. Description of the Prior Art

Most modern automobile and vehicle electrical systems employ alternators driven by the vehicle engine to source electrical energy for the electrical circuitry of the vehicle, as well as to charge the battery of the vehicle. Typically, the output of an alternator is a three-phase, AC signal that is rectified by a trio of diode pairs. The resulting output to the vehicle has a ripple associated with it. The ripple causes several problems in the vehicle, the most obvious of which is a whine in the radio when tuning very weak stations. The ripple also causes problems for the alternator voltage regulator. The output voltage from the alternator is generally specified to accuracies of 0.1 volts or so, but the ripple can be higher than 5 volts in American cars, and higher still in European applications, especially where the battery is in a remote location such as the trunk of the vehicle.

A major problem encountered in voltage regulator designs is filtering the ripple to enable the actual system voltage to be accurately sensed. The normal approach is to use an analog low pass filter, requiring at least a capacitor external to the integrated circuit performing sensing and regulation functions. Most regulators are mounted directly to the alternator, and are therefore located in a very hostile environment from a temperature and vibration point of view. Such conditions demand that a minimum number of components be used for best reliability.

SUMMARY OF THE INVENTION

In light of the above, it is, therefore, an object of the invention to provide an improved filter for use in conjunction with an automotive alternator to reduce ripple in sensing the output voltage of the alternator.

It is another object of the invention to provide a method and apparatus of the type described which reduces or eliminates the need for analog filters from the sensing channel of an automotive alternator.

It is another object of the invention to provide an improved method and apparatus of the type described which automatically adapts to the operating mode and speed of the alternator with which it is used.

These and other objects, features, and advantages will become apparent to those skilled in the art from the following detailed description, when read in conjunction with the accompanying drawings and appended claims.

The invention in its broad aspect presents a circuit for reducing the ripple in an output of a multi-phase alternator in a vehicle system having a regulating circuit that regulates the output of the alternator. The circuit includes a switch connected in series between a system voltage and the regulating circuit, and means for closing the switch at a predetermined phase of the voltage of at least one of the stator windings of the alternator. The means for closing the switch operates to close the switch at a conduction switchover point among the stator windings in synchronism with a voltage waveform of the at least one of the stator windings, and is timed to produce an aliased waveform for application to the regulator. The output of the switch is applied to an integrator for integrating the output voltage from the alternator during an entire time cycle period of one of the windings of the stator coils for application to the regulator.

In accordance with another broad aspect of the invention, a method for reducing the ripple in an output of a multi-phase alternator in a vehicle is presented. In accordance with the method, a switch is provided, connected in series between a system voltage and a voltage regulating circuit. The switch is closed at a predetermined phase of the voltage of at least one of the stator windings of the alternator.

BRIEF DESCRIPTION OF THE DRAWING

The invention is illustrated in the accompanying drawing in which.

DETAILED DESCRIPTION OF THE PREFERRED EMBODIMENTS

Figure 1:
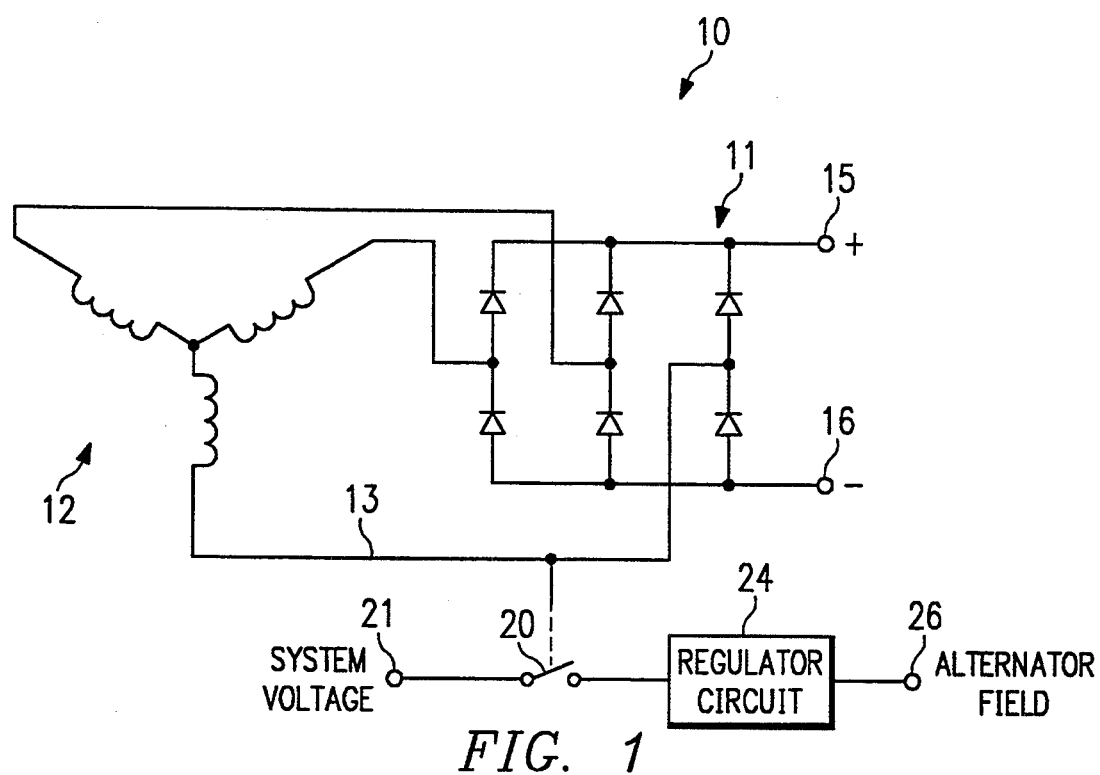
FIG. 1 is an electrical schematic diagram of a circuit for filtering the ripple in an output of a multi-phase vehicle alternator, in accordance with a preferred embodiment of the invention.
Figure 2:
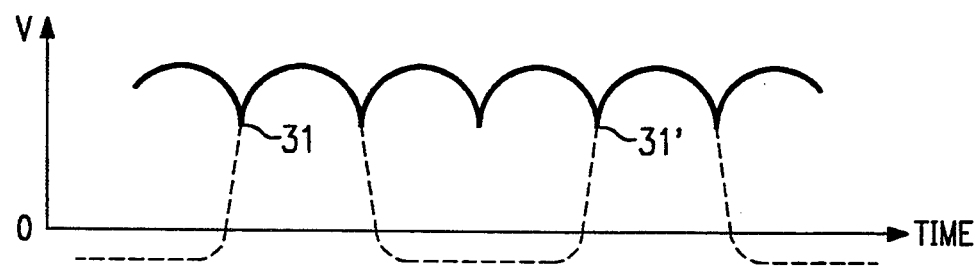
FIG. 2 is a comparison of voltage waveforms produced by a vehicle alternator (solid line) and produced by a single stator phase sense voltage device (dotted line).

FIG. 1 shows an alternator ripple filter circuit 10, in accordance with a preferred embodiment of the invention. The circuit 10 includes a plurality of "Y" connected stator windings that produce AC output waveforms which are rectified in a rectifier network 11. The rectifier network 11 includes three sets of diode pairs, the commonly connected anodes of which producing the negative output and the commonly connected cathodes of which producing the positive output for delivery to the electrical system of the vehicle (not shown) with which the circuit 10 is employed. The respective coils of the stator windings are connected to the respective anode and cathode junctions of the pairs of diodes in the rectifier network 11, as shown. The waveform of the voltage produced at the plus and minus terminals 15 and 16 is shown by the solid line curve in FIG. 2.

One of the lines 13 interconnecting one of the coils from the stator assembly 12 to an anode-cathode connection of one of the rectifier pairs is used to sense the voltage produced by the stator winding assembly 12. The voltage waveform seen on line 13 is seen by the dotted line wave shown in FIG. 2. The stator voltage may be derived, for example, from one of the stator coils on a line 13 that may be connected to the connection between the diodes of a diode array of the type generally employed in conjunction with most alternator systems. Such sampling node is typically existing in most alternator systems, for example to signal "no rotation" of the rotor, to indicate a broken drive belt, or other such problem.

A circuit is employed using the signal developed on the line 13 to minimize the ripple that is produced on the output terminals 15 and 16. The circuitry includes a switch 20 which is opened and closed by the signal on the line 13. The switch 20 may, for example, be a semiconductor power switch transistor or other suitable device. The switch 20 is connected on one side to the system voltage on node 21. The system voltage may include the voltage seen at one of the battery terminals (not shown). The other side of the switch 20 is connected to a regulator circuit 24 to develop an output on node 26 that is delivered to the alternator field winding. The output of the switch 20 may be applied to an integrator 22 for integrating the output voltage from the alternator during an entire time cycle period of one of the windings of the stator coils for application to the regulator 24. The regulator circuit 24 may be, for example, a sample and hold circuit or the like, such circuits being known in the art, and are not described herein in detail.

The operation of the circuit switch 20 is arranged so that the switch 20 is closed at a definite time during the cycle of the waveform seen on the line 13. More particularly, the circuit switch 20 is arranged to close momentarily at a time when the voltage on the line 13 reaches the switch over voltage 31 when output delivered to the output nodes 15 and 16 is switched from one coil to the coil to which line 13 is connected. Thus, the regulator circuit 24 is constructed so that it can hold the voltage instantaneously appearing at the switch over point 31 until the next occurring switch over point 31' at the next cycle along the waveform seen on the line 13.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A circuit in a vehicle system for reducing the ripple in an output of a multi-phase alternator having a plurality of stator windings, said vehicle system having a regulating circuit that regulates the output of the alternator, comprising:

a switch connected in series between a system battery voltage and the regulating circuit;

said switch being connected to receive a signal produced by one of the stator windings to be closed in response to a voltage waveform of said one of the stator windings at a predetermined phase of the voltage of said one of the stator windings at a conduction switchover point among the stator windings.

2. The circuit of claim 1 wherein said switch is timed to be closed to produce an aliased waveform for application to the regulating circuit.

3. The circuit of claim 1 further comprising an integrator for integrating an input voltage to the regulating circuit.

4. The circuit of claim 3 wherein said integrator integrates said input voltage during a fixed fraction of a time cycle period of said one of the stator windings.

5. The circuit of claim 3 wherein said integrator integrates said input voltage during an entire time cycle period of said one of the stator windings.

6. A method for reducing the ripple in an output of a multi-phase alternator having a plurality of stator windings in a vehicle having a system battery voltage and a voltage regulator circuit, comprising:

developing a signal that indicates when conduction switches between first and second ones of the stator windings;

in response to said signal, interconnecting the system battery voltage and the voltage regulator circuit at a time at which conduction switches between the stator windings.

7. The method of claim 6 further comprising integrating an input voltage to the regulator.

8. The method of claim 6 further comprising integrating an input voltage to the regulator during a fixed fraction of an entire time cycle period of one of the stator windings.

9. The method of claim 6 further comprising integrating an input voltage to the regulator during an entire time cycle period of one of the stator windings.

* * * * *